US012664041B2

(12) United States Patent
Balasubramanian et al.

(10) Patent No.: US 12,664,041 B2
(45) Date of Patent: Jun. 23, 2026

(54) SYSTEMS AND METHODS FOR FAST-MAPPING OF COARSE-GRAINED RECONFIGURABLE ARRAYS

(71) Applicants: Mahesh Balasubramanian, Tempe, AZ (US); Aviral Shrivastava, Phoenix, AZ (US)

(72) Inventors: Mahesh Balasubramanian, Tempe, AZ (US); Aviral Shrivastava, Phoenix, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 253 days.

(21) Appl. No.: 18/603,761

(22) Filed: Mar. 13, 2024

(65) Prior Publication Data

US 2024/0311230 A1     Sep. 19, 2024

Related U.S. Application Data

(60) Provisional application No. 63/451,876, filed on Mar. 13, 2023.

(51) Int. Cl.
*G06F 9/44* (2018.01)
*G06F 11/07* (2006.01)

(52) U.S. Cl.
CPC ...... *G06F 11/0793* (2013.01); *G06F 11/0721* (2013.01)

(58) Field of Classification Search
CPC ........................ G06F 11/0793; G06F 11/0721
See application file for complete search history.

(56) References Cited

U.S. PATENT DOCUMENTS

| | | | |
|---|---|---|---|
| 8,589,441 B1 * | 11/2013 | Sunada ................. | G06F 21/554 |
| | | | 707/703 |
| 2006/0048123 A1 * | 3/2006 | Martin ................. | G06F 8/4452 |
| | | | 717/160 |
| 2016/0162547 A1 * | 6/2016 | Morris .............. | G06F 16/24542 |
| | | | 707/718 |
| 2021/0034485 A1 * | 2/2021 | Danilov .............. | G06F 11/2094 |
| 2023/0315406 A1 * | 10/2023 | Rister .................... | G06F 8/433 |

OTHER PUBLICATIONS

Balasubramanian, "PathSeeker: A Fast Mapping Algorithm for CGRAs" (Paper), 2022, pp. 1-6, Tempe, AZ.

(Continued)

*Primary Examiner* — Qamrun Nahar
(74) *Attorney, Agent, or Firm* — Polsinelli PC

(57) ABSTRACT

A mapping approach ("PathSeeker") for CGRAs analyzes mapping failures and performs local adjustments to a schedule to obtain a mapping. First, instead of backtracking or restarting the mapping as in previous mapping methods, PathSeeker analyzes the predecessor and successor nodes to find the reason behind the failed mapping. Second, PathSeeker explores local transformations for the predecessor and successor of the failed node to achieve a valid mapping. Finally, when local transformations do not yield a valid mapping, different PE positions of the other nodes in the time-slot of the failed node, the predecessor, and successor are iteratively explored, to find a valid mapping.

20 Claims, 6 Drawing Sheets

(56) References Cited

OTHER PUBLICATIONS

Frank Bouwens, Mladen Berekovic, Bjorn De Sutter, and Georgi Gay-dadjiev. Architecture enhancements for the adres coarse-grained re-configurable array. In International Conference on High-Performance Embedded Architectures and Compilers, pp. 66-81. Springer, 2008.

Prasanth Chatarasi, Hyoukjun Kwon, Natesh Raina, Saurabh Malik, Vaisakh Haridas, Angshuman Parashar, Michael Pellauer, Tushar Krishna, and Vivek Sarkar. Marvel: A data-centric compiler for dnn operators on spatial accelerators. arXiv preprint arXiv:2002.07752, 2020.

Shuai Che, Michael Boyer, Jiayuan Meng, David Tarjan, Jeremy W Sheaffer, Sang-Ha Lee, and Kevin Skadron. Rodinia: A benchmark suite for heterogeneous computing. In 2009 IEEE international symposium on workload characterization (IISWC), pp. 44-54. Ieee, 2009.

Liang Chen and Tulika Mitra. Graph minor approach for application mapping on cgras. ACM Transactions on Reconfigurable Technology and Systems (TRETS), 7(3):21, 2014.

Yu-Hsin Chen, Joel Emer, and Vivienne Sze. Eyeriss: A spatial architecture for energy-efficient dataflow for convolutional neural networks. ACM SIGARCH Computer Architecture News, 44(3):367-379, 2016.

Yunji Chen, Tianshi Chen, Zhiwei Xu, Ninghui Sun, and Olivier Temam. DianNao family: energy-efficient hardware accelerators for machine learning. Communications of the ACM, 59(11):105-112, 2016.

Andrew Crotty, Alex Galakatos, Kayhan Dursun, Tim Kraska, Ugur Çetintemel, and Stanley B Zdonik. Tupleware:"big" data, big analytics, small clusters. In CIDR, 2015.

Shail Dave, Mahesh Balasubramanian, and Aviral Shrivastava. RAMP: resource-aware mapping for CGRAs. In Proceedings of the 55th Annual Design Automation Conference (DAC), 2018.

Shail Dave and Aviral Shrivastava. CCF: A CGRA Compilation Framework. Compiler Microarchitecture Lab, Arizona State University, 2018, 1 page.

Ashay Dharwadker. The Clique Algorithm. Institute of Mathematics, 2006, 41 pages.

Matthew Guthaus et al. Mibench: A free, commercially representative embedded benchmark suite. In WWC, 2001.

Mahdi Hamzeh, Aviral Shrivastava, and Sarma Vrudhula. EPIMap: using epimorphism to map applications on cgras. In Proceedings of the 49th Annual Design Automation Conference, pp. 1284-1291. ACM, 2012.

Mahdi Hamzeh, Aviral Shrivastava, and Sarma Vrudhula. REGIMap: Register-aware application mapping on coarse-grained reconfigur-able architectures (cgras). In Proceedings of the 50th Annual Design Automation Conference, p. 18. ACM, 2013.

Kyuseung Han, Junwhan Aim, and Kiyoung Choi. Power-efficient predication techniques for acceleration of control flow execution on cgra. ACM Transactions on Architecture and Code Optimization (TACO), 10(2):8, 2013.

Akira Hatanaka and Nader Bagherzadeh. A modulo scheduling algorithm for a coarse-grain reconfigurable array template. In Parallel and Distributed Processing Symposium, 2007. IPDPS 2007. IEEE International, pp. 1-8. IEEE, 2007.

Manupa Karunaratne, Aditi Kulkami Mohite, Tulika Mitra, and Li-Shiuan Peh. HyCUBE: A CGRA with Reconfigurable Single-Cycle Multi-Hop Interconnect. In Proceedings of the 54th Annual Design Automation Conference 2017, pp. 1-6, 2017.

Chris Lattner and Vikram Adve. LLVM: A compilation framework for lifelong program analysis & transformation. In CGO, 2004.

Bingfeng Mei, Serge Vernalde, Diederik Verkest, Hugo De Man, and Rudy Lauwereins. Exploiting loop-level parallelism on coarse-grained reconfigurable architectures using modulo scheduling. IEE Proceedings-Computers and Digital Techniques, 150(5):255, 2003.

B Mei, M Berekovic, and JY Mignolet. Adres & dresc: Architecture and compiler for coarse-grain reconfigurable processors. In Fine-and coarse-grain reconfigurable computing, pp. 255-297. Springer, 2007.

Taewook Oh, Bernhard Egger, Hyunchul Park, and Scott Mahlke. Recurrence cycle aware modulo scheduling for coarse-grained reconfigurable architectures. In ACM Sigplan Notices, vol. 44, pp. 21-30. ACM, 2009.

Hyunchul Park, Kevin Fan, Manjunath Kudlur, and Scott Mahlke. Modulo graph embedding: mapping applications onto coarse-grained reconfigurable architectures. In Proceedings of the 2006 international conference on Compilers, architecture and synthesis for embedded systems, pp. 136-146. ACM, 2006.

Hyunchul Park, Kevin Fan, Scott A Mahlke, Taewook Oh, Heeseok Kim, and Hong-seok Kim. Edge-centric modulo scheduling for coarse-grained reconfigurable architectures. In Proceedings of the 17th international conference on Parallel architectures and compilation techniques, pp. 166-176. ACM, 2008.

B Ramakrishna Rau. Iterative modulo scheduling. International Journal of Parallel Programming, 24(1), 1996.

John A Stratton, Christopher Rodrigues, I-Jui Sung, Nady Obeid, Li-Wen Chang, Nasser Anssari, Geng Daniel Liu, and Wen-mei W Hwu. Parboil: A revised benchmark suite for scientific and commercial throughput computing. Center for Reliable and High-Performance Computing, 127, 2012.

Panagiotis Theocharis and Bjorn De Sutter. A bimodal scheduler for coarse-grained reconfigurable arrays. ACM Transactions on Architecture and Code Optimization (TACO), 13(2):1-26, 2016.

* cited by examiner

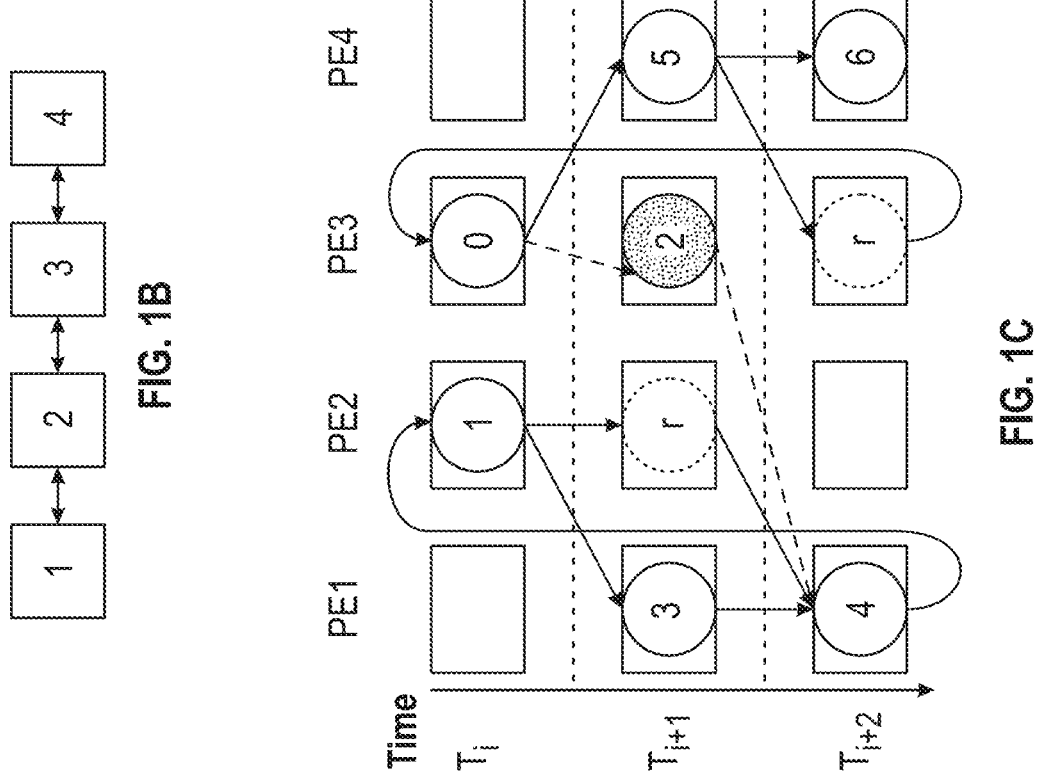
FIG. 1B
FIG. 1C
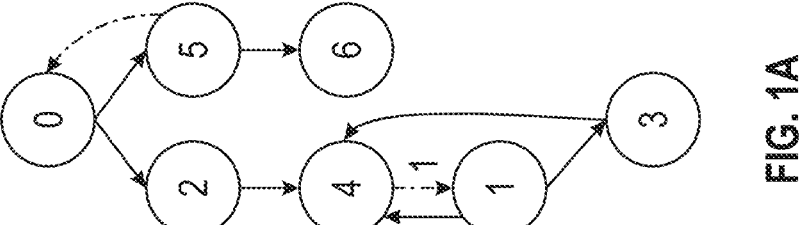
FIG. 1A

Rodinia

SYSTEMS AND METHODS FOR FAST-MAPPING OF COARSE-GRAINED RECONFIGURABLE ARRAYS

CROSS REFERENCE TO RELATED APPLICATIONS

This is a non-provisional application that claims benefit to U.S. Provisional Application Ser. No. 63/451,876, filed on Mar. 13, 2023, which is herein incorporated by reference in its entirety.

GOVERNMENT SUPPORT

This invention was made with government support under 1645578 awarded by the National Science Foundation. The government has certain rights in the invention.

FIELD

The present disclosure generally relates to coarse-grained reconfigurable arrays, and in particular, to a system and associated method for fast and optimized mapping of coarse-grained reconfigurable arrays.

BACKGROUND

The advancement of Internet and data collecting devices have increased the demand for high-performance, low-power computing alternatives. All mobile devices collect, process, and communicate data. Analyzing the collected data to extract meaningful information is compute-intensive and often limited by the thermal, power and resource constraints. Coarse-Grained Reconfigurable Arrays (CGRAs) are promising accelerators that provide high efficiency at low power, however efficient mapping of CGRAs can be a challenging and computationally expensive endeavor.

It is with these observations in mind, among others, that various aspects of the present disclosure were conceived and developed.

BRIEF DESCRIPTION OF THE DRAWINGS

FIGS. 1A-1C are a series of graphical representations respectively showing: a) DFG of an application loop; (b) A 1×4 CGRA target architecture; and (c) Failure to map node 2 by GraphMinor;

Corresponding reference characters indicate corresponding elements among the view of the drawings. The headings used in the figures do not limit the scope of the claims.

DETAILED DESCRIPTION

Figures 2A, 2B:
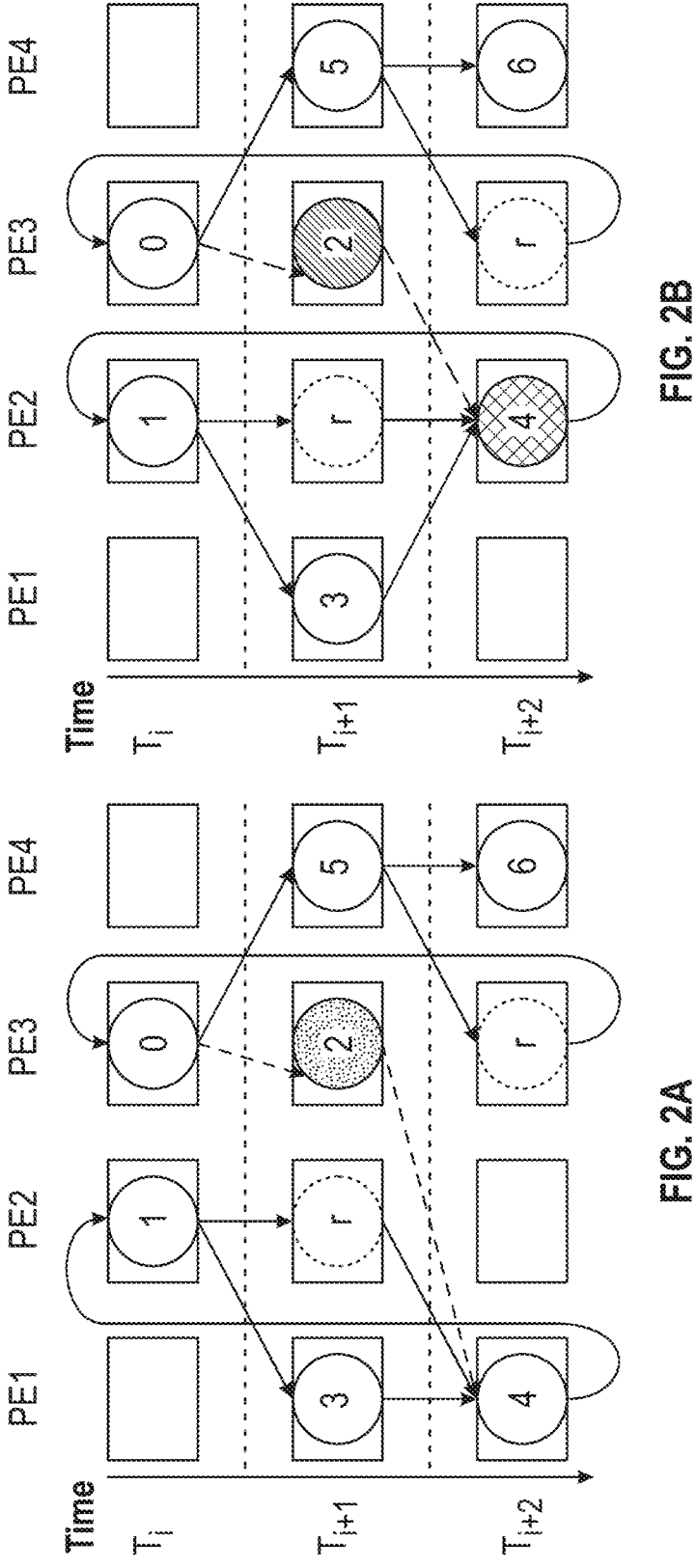
FIGS. 2A and 2B are a pair of graphical representations showing: (a) Mapping failure due to GraphMinor; and (b) PathSeeker's localized modifications results in a valid mapping faster.

Coarse-grained reconfigurable arrays (CGRAs) have gained traction over the years as a low-power accelerator due to the efficient mapping of the compute-intensive loops onto the 2-D array by the CGRA compiler. When encountering a mapping failure for a given node, existing mapping techniques either exit and retry the mapping anew, or perform backtracking, i.e., recursively remove the previously mapped node to find a valid mapping. Abandoning mapping and starting afresh can deteriorate the quality of mapping and the compilation time. Even backtracking may not be the best choice since the previous node may not be the incorrectly placed node. To tackle this issue, a mapping approach ("PathSeeker") is disclosed herein that analyzes mapping failures and performs local adjustments to the schedule to obtain a mapping. Experimental results on 35 top performance-critical loops from MiBench, Rodinia, and Parboil benchmark suites demonstrate that PathSeeker can map all of them with better mapping quality and dramatically less compilation time than the previous state-of-the-art approaches—GraphMinor and RAMP, which were unable to map 20 and 5 loops, respectively. Over these benchmarks, PathSeeker achieves 28% better performance at 550× compilation speedup over GraphMinor and 3% better performance at 10× compilation speedup over RAMP on a 4×4 CGRA.

1. Introduction

A CGRA includes a simple 2-D grid of Processing Elements or PEs. Each PE contains Functional Units (FUs) that can receive instructions from the instruction memory, compute arithmetic operations with the data received from the data memory or the neighboring PEs. Each PE consists of MUXes to select the inputs from its neighbors and a register file to store intermittent data. Prime examples of CGRAs are accelerators that have been used for power-efficient acceleration of machine learning models like Convolution Neural Networks (CNNs), Deep Neural Networks (DNNs), etc.

In order to achieve the high performance and highly power-efficient operation of CGRAs good compilers are needed, which will be able to obtain a good quality mapping of performance-critical loops from applications. CGRA compilers can be classified into two categories: (1) Parallel-loop compilers, (2) Modulo Scheduling-based compilers. Parallel-loop compilers employ various compiler optimizations to exploit the inherent spatial and temporal parallelization strategies to map parallel loops of an application onto the PEs of the accelerator However, not all the compute-intensive loops of an application may be parallel, and those can be accelerated through modulo scheduling-based compilers. Modulo-scheduling based compilers accelerate the data flow graph of the loop body through the pipelining present in the CGRAs using software pipelining. This disclosure focuses on the modulo scheduling-based compiler techniques that can support a wide variety of application loops.

One of the biggest limitations of the existing modulo scheduling-based state-of-the-art CGRA mapping techniques is that, when trying to map loops onto the CGRA if a mapping attempt fails, these techniques either discard the current mapping and restart anew or backtrack to the previously mapped node. Techniques that restart do not learn anything from the failure, and just blindly explore the mapping space. Even the backtracking-based approaches may not be effective, as they recursively un-map the last mapped node, while the last node may not be the one that is making the mapping infeasible. As a result, existing modulo scheduling-based state-of-the-art CGRA mapping techniques are unable to map some performance-critical loops even after 27 hours. This not only exacerbates the compilation time, but given reasonable limits on compilation time, it also negatively impacts the quality of the mapping achieved by these techniques.

To address these concerns, the present disclosure provides an inventive solution which can take the form of a mapping method-dubbed "PathSeeker." First, instead of backtracking or restarting the mapping like the previous mapping methods, PathSeeker analyzes the predecessor and successor nodes to find the reason behind the failed mapping. Second, PathSeeker explores local transformations for the predecessor and successor of the failed node to achieve a valid mapping. Finally, when local transformations do not yield a valid mapping, different PE positions of the other nodes in the time-slot of the failed node, the predecessor, and successor are iteratively explored, to find a valid mapping. The mapping quality generated by PathSeeker is compared to that of GraphMinor and RAMP, which are state-of-the-art mapping algorithms in backtracking and restart, respectively. Experimental results on 35 application loops from the top three benchmark suites, MiBench, Rodinia, and Parboil show that (i) PathSeeker can map all the 35 application loops on 4×4 CGRA, whereas GraphMinor and RAMP were not able to map 20 and 5 loops, respectively, (ii) PathSeeker achieves a better quality of mapping at lower compilation time with 550× and 10× compilation time speedup over GraphMinor and RAMP respectively, (iii) PathSeeker scales well across different sizes of CGRA.

2. Related Work

In the context of response to a mapping failure, the existing modulo scheduling-based CGRA compiler techniques can be classified into two categories, i) restart and ii) backtrack. Genetic algorithms, simulated annealing, minimum common subgraph (MCS) or maximal clique based techniques can be classified as restart. Minimum common subgraph and maximal clique techniques discard the mapping on failure and search for another mapping. Simulated Annealing techniques try random time-slot and PE placements for the failed nodes, generally, having higher compilation times.

Some methods perform backtracking on a mapping failure; including forming clusters from the DFG and map the clusters one-by-one. If unable to find a mapping for a node, the current cluster mapping is discarded, and the algorithm backtracks to the cluster that was mapped prior. However, another method maps the DFG by prioritizing nodes based on the critical path, one node at a time, and uses an exhaustive search technique. On a failure, that method backtracks to the previously mapped node in the mapped order. Essentially, that method un-maps the last mapped node and tries again by mapping that node to a different place (PE). If that does not work, it continues to un-map the nodes in the reverse order in which they were mapped and keeps trying. However, the last node mapped may not be the problematic node. Even if that last node were re-mapped, it might not enable a valid mapping. One example proposes a mapping technique for a highly connected CGRA that uses a multi-hop multi-cast path system to communicate data in a single cycle. One method's single-cycle communication may provide better II, but at the cost of scalability. Since the interconnect crossbar selection is a part of that method's instruction set, which negatively impacts the power and performance as the CGRA size increases.

3. Motivating Example

In GraphMinor, the order in which the nodes are mapped plays an important role in determining the compilation time. GraphMinor sorts the nodes of the DFG in the order of the critical paths and cycles. FIG. 1C shows a mapping failure of node 2 due to unavailability of connected PEs (connected resource for PE1 and PE3 is PE2 that is occupied by r). GraphMinor backtracks to previously mapped node 6, which does not affect the mapping of 2. It checks all the different mapping for 6 and on a failure to find a valid mapping for 2, GraphMinor backtracks to nodes 0 and 5. Node 0 is the predecessor of node 2 but the problem does not lie there. GraphMinor does not find a valid mapping for 2, so it backtracks again to node 1, and node 3, for which it cannot find a valid mapping for node 2. After backtracking through all the mapped nodes, GraphMinor reaches 4 wherein the actual problem lies. Now remapping node 4 will yield in a mapping. GraphMinor fails to identify that the problem was one step away—remapping node 4 would have fixed the mapping in the first attempt. Due to the exhaustive nature of the GraphMinor algorithm, the compilation time increases exponentially with an increase in DFG size (compute intensive section with more nodes and recurrences) and CGRA size.

The aim of RAMP is to find the optimal routing between two operations that are scheduled more than one cycle apart by the scheduler. The core algorithm for finding PE for a node in the DFG is the maximal clique algorithm. RAMP takes three steps to resolve all the routing issues and find a maximal clique. On every attempt, RAMP tries to find a maximal clique, and an increase in DFG size due to the addition of routing resources also increases the mapping search time. Another drawback of the RAMP is that it does not isolate the failed mapping. The maximal clique algorithm is time-consuming, $O(N^8)$, where N is a product of nodes in DFG and CGRA size. Restarting the algorithm on every failure will possibly lead to a longer compilation time.

As illustrated, the existing mapping approaches do not solve the mapping failure by targeting the failed node and hence suffers from poor performance or increased compilation time to converge at a valid mapping. Given the NP-completeness nature of the mapping, one cannot be certain if these techniques will produce a mapping within a finite time. The objective of PathSeeker is to achieve a good quality mapping within a limited amount of time for all the application loops considered across various sizes of CGRA.

5
4. Present Approach

| Algorithm 1: PathSeeker (List AList, Node v) |
| --- |

```
1      Initialize empty queue;
2      Visited ⌊v⌋ =true
3      Queue. push(v);
4      While (queue ≠ empty)do
5      |   v = queue. front( )
6      |   queue. pop(v);
7      |   if is_already_mapped(v)then
8      |   |   continue
9      |   P ← Get_Mapped_Pred(v);
10     |   S ← Get_Mapped_Succ(v);
11     |   Γ ← Get_Connected_PEs(v, P, S)
12     |   If Γ.size( ) = 1 then
13     |   |   PE ← Γ(0);
14     |   else if Γ.size( ) > 1 then
15     |   |   PE ←_—(Rand(_—. size( ));
16     |   else
17     |   |   if Localized_Seach(v, P, S) ≠ true then
18     |   |   |   if Recovery_Level_One(v, P, S) ≠ true
19     |   |   |         then
20     |   |   |   |         if
21     |   |   |   |   Recovery_Level_Two(v, P, S) ≠ true
22     |   |   |   |         then
23     |   |   |   |   ⌊return failure;
24     SetMappablePOstitions(v, Γ);
25     SetCurrentPosition(v, PE) ;
26     |   |   for i in AList[v]do
       |   |   |   if visited[i] ≠ 0 then
       |   |   |   visitetd[i] = true;
       |   |   ⌊   queue.push(i)'
       |   ⌊
       ⌊
27     Return success
```

When encountering a mapping failure for a given node, existing mapping techniques either exit and retry the mapping anew, or perform backtracking, i.e., recursively remove the previously mapped node to find a valid mapping. Abandoning mapping and starting afresh can deteriorate the quality of mapping and the compilation time. Even backtracking may not be the best choice since the previous node may not be the incorrectly placed node. To tackle this issue, the instant mapping approach (PathSeeker) analyzes mapping failures and performs local adjustments to the schedule to obtain a mapping.

Instead of backtracking or restarting the mapping like the previous mapping methods, PathSeeker analyzes the predecessor and successor nodes to find the reason behind the failed mapping. Second, PathSeeker explores local transformations for the predecessor and successor of the failed node to achieve a valid mapping. Finally, when local transformations do not yield a valid mapping, different PE positions of the other nodes in the time-slot of the failed node, the predecessor, and successor are iteratively explored, to find a valid mapping.

Current mapping algorithms for CGRA do not learn from the failure or take corrective actions to rectify it. PathSeeker takes corrective actions during a mapping failure with minimal overhead. This has improved the compilation time and the quality of mapping achieved by PathSeeker compared to the state-of-the-art mapping approaches. Summarized aspects of PathSeeker are shown below, and discussion is provided in the following with respect to Algorithm 1 above.

a. Identify the problem node and analyze the predecessor and successor. Create data structures for each node to hold the current position and possible positions based on predecessor and successor.
b. Level One Recovery: Make changes to predecessor or successor nodes connected to the failed node.

c. Level Two Recovery: Novel Timeslot level remapping of nodes in the failed node's timeslot. Update the predecessors and successors if there are any modifications.

i) PathSeeker introduces timeslot level remapping, where the nodes mapped to the current node's timeslot are taken and for each of the already mapped nodes local remapping is performed.

d. Level Three Recovery: Timeslot level remapping of the nodes in the predecessor and successor's timeslot.

i) PathSeeker introduces timeslot level remapping for predecessor and successor nodes of the current failed node in an iterative manner.

e. Randomized placement if there are more than one possible position.

A driver function calls the PathSeeker mapping routine to map the scheduled operations. The PathSeeker method is shown in Algorithm 1. Lines 1-3 initialize an empty queue and pushes the node v into the queue. For a given node v chosen from lines 5, lines 7 and 8 check if the node has been already mapped. The method continues further only if the node is not mapped, otherwise the next node in the queue is selected. Lines 9 and 10, Get_Mapped_Pred( ) and Get-_Mapped_Succ( ) routines, return only the predecessors and successors of the current node that are already mapped. Get_Connected_PEs( ) function, in line 11, returns all the possible free PEs that are connected to the mapped predecessor and successors from the Modulo Resource Routing Graph (MRRG). PathSeeker starts the mapping in a reverse breadth-first search graph traversal (using an adjacency list AList) to aid the mapping of predecessors easily. This design decision was taken by analyzing the loops considered for the experiments. Since the nodes are already scheduled to a time-slot before mapping, taking a reverse breadth first search (BFS) approach will aid the mapping of predecessor node with fewer mapping failures. For example, upon analysis of the breadth first search with predecessors mapped first followed by the successor nodes, due to the random placement of the predecessors, there was a high chance that the predecessor nodes are placed in non-connected PEs, which resulted in a successor node mapping failure.

Based on the size of the Γ from line 11, the placement (PE) for the node v is chosen. If Γ size is one then that PE is chosen in line 13, or if more than one possible PE positions are available a random PE is chosen from line 15. An empty Γ means that there were no possible placements available for the node v. At this juncture, PathSeeker employs a three-tier recovery approach to find a valid placement for node v. In line 17, the Localized_Search( ) routine is invoked. On a failure of this routine, in line 18 Recovery_Level_One( ) routine is called. On a Level One failure, Recovery_Level_Two( )routine is employed, in line 19. The Level One and Level Two routines use complex time-slot level remapping procedures to find a valid mapping for node v. All the three recovery methodologies are explained in detail in the following subsections. In an event of all three recovery failures, the PathSeeker method is restarted for the given II. When a valid mapping is found, all the possible placements i.e., Γ, and the selected PE are stored for recovery purposes by SetMappablePositions( ) and SetCurrentPosition( ) routines, respectively in lines 21 and 22. Line 23-26 selects the next adjacent node to v and adds it to the queue to continue the mapping procedure.

---

Algorithm 2: Localized_Search(Node
v. Predecessor P, Successor S_)

---

```
1     timeslot ← Get_Modulo_Schedule_Time(v)
2     mapped_pre_succ ← P.size( ) + S.Size( )
3     succ_map_set ← Ø
4     pred_map_set ← Ø
5     v_pe ← Get_Free_PEs(timeslot)
6
7     |  for i in v_pe do
8     |  |   for j in S do
9     |  |    s_pe ← GetMappablePositions(j)
10    |  |    |   for jj in s_pe do
11    |  |    |    for k in P do
12    |  |    |    |   p_pe ← GetMappablePositions(k)
13    |  |    |    |    for kk in p_pe do
14    |  |    |    |    |   if connectedPEs(i, kk, jj)then
15    |  |    |    |    |    Γ.insert(i)
16    |  |    |    |    |    succ_map_set.insert(k)
17    |  |    |    |    |    pred_map_set.insert(j)
      |  |    |    |    |    store_connected_pes(i, kk, jj)
18    |   if Γ.size ( ) = 0 then
19    |          return false
20    Update Γ and PE values
21    Return success
```

---

On a failure to map a node PathSeeker invokes the Localized_Search( ) algorithm shown in Algorithm 2. The algorithm searches through the possible positions of the predecessors and the successors to find a valid placement for the failed node. Lines 6-17 search through both predecessors' and successors' possible positions when there are mapped predecessors and successors for the failed node. This localized search routine does not modify any other nodes that are already mapped onto the CGRA. The Get-MappablePositions( ) function in lines 8 and 11 retrieves the possible PE positions stored in line 21 in Algorithm 1. On finding a successful connected PE, the PE position for node v (failure node) is stored into Γ array. A valid mapping is obtained for node v only if all the predecessors and successors have a connected PE to v. Lines 16 and 17 updates the predecessor nodes and successor nodes, which is used to check if all the predecessors and successors were able to successfully find a connected PE. On failure of this localized search (when Γ's size is 0), PathSeeker invokes the Recovery_Level_One( ) routine, from Algorithm 1, line 18. Lines 10 and 12 are modified when the failed node does not have a predecessor mapped.

The Recovery_Level_One( ) routine employs the novel timeslot level remapping. The remapping starts by collecting all the nodes mapped to current timeslot as that of the failed node. Next, the remapping method iterates over the mappable positions of each node and remaps them. On remapping each node, the valid position for the failed node is checked. This local rearrangement of the already mapped nodes to the timeslot is the novelty of PathSeeker, and it helps to change the course of the mapping. On a successful mapping of the failed node, the current remapping of the nodes is finalized and their positions are updated.

Algorithm 1 line 19, calls the Recovery_Level_Two( ) routine on a Level One failure. Developed from Level One, the Recovery_Level_Two( ) algorithm, not only remaps the nodes in the failure node's (node v) timeslot, but also remaps the nodes present in the successors' and the predecessors' timeslots. On a Recovery Level Two failure, the PathSeeker algorithm restarts with a new design space to be explored.

5. Running Example

FIGS. 2A and 2B show the working of the PathSeeker technique on a failure to map node 2. FIG. 2A shows the failure to map node 2 encountered by GraphMinor. For the failure in FIG. 2A, PathSeeker's Localized_Search function is invoked first which gets the predecessors and successors of failed node 2, i.e., node 0 and node 4, respectively. PathSeeker iterates through all the possible positions to find a valid mapping of the successor, and consecutively the predecessor. There is just one possible position for node 4, i.e., PE3, which meets all the dependencies. A valid mapping by PathSeeker for this failure case is shown in FIG. 2B. PathSeeker calls the Localized Search to modify the path mapping of 4 to find a valid mapping for 2. It can be observed that PathSeeker's Localized_Search does not modify the placements of other mapped nodes and instead only explores within the existing mapping. In a hypothetical case where there is no possible mapping available for node 2, Level One recovery routine will be called to remap the nodes in time-slot $T_{i+1}$. On a failure to find a valid mapping from Level One recovery, Level Two recovery function will be called to remap the nodes in time-slot $T_{i+2}$ and subsequently the nodes in time-slot $T_i$, which are the successor and predecessor time-slots of node 2. While previous techniques explore the design space on a node-by-node basis, PathSeeker explores the mapping space on a time-slot level.

6. Experimental Results

Setup: Applications from three widely used benchmark suites were profiled: MiBench, Rodinia, and Parboil. These benchmarks depict a wide variety of application domains comprising of embedded system applications like automotive, industry, office, network, security, and telecommunication, heterogeneous applications like data mining, pattern recognition, image processing, graph algorithms, and high performance computing application like spare matrix-dense vector multiplication (spmv).

Compilation: The extraction of loops and converting them to Data Flow Graph (DFG) were performed using CCF, an LLVM 4.0 based CGRA compilation and simulation framework. Partial predication was implemented for compiling loops with conditionals, as was path-sharing (implemented in Graph-Minor). RAMP, GraphMinor, and PathSeeker (proposed technique) mapping algorithms as passes in CCF. The application loops were compiled with optimization level 3, to avoid those loops that are vectorizable by the compiler. The three mapping algorithms were scaled across five CGRA sizes, namely 4×4, 5×5, 6×6, 7×7, and 8×8 for scalability. Loops with system calls were avoided as they cannot be accelerated on CGRA.

A. PathSeeker Maps All the Loops on a 4×4 CGRA at a Lower II

Figure 3:
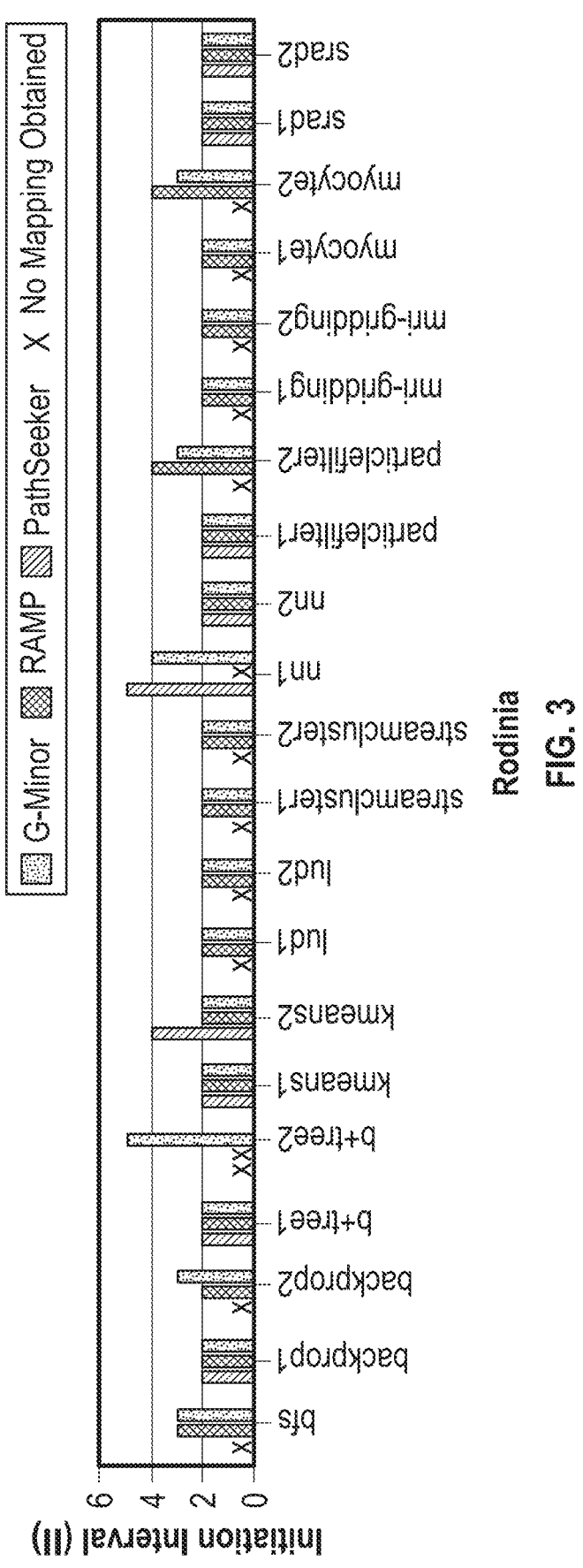
FIG. 3 is a graphical representation showing performance (II) comparison of PathSeeker with GraphMinor (G-Minor) and RAMP for application loops from Rodinia on a 4×4 CGRA.
Figure 4:
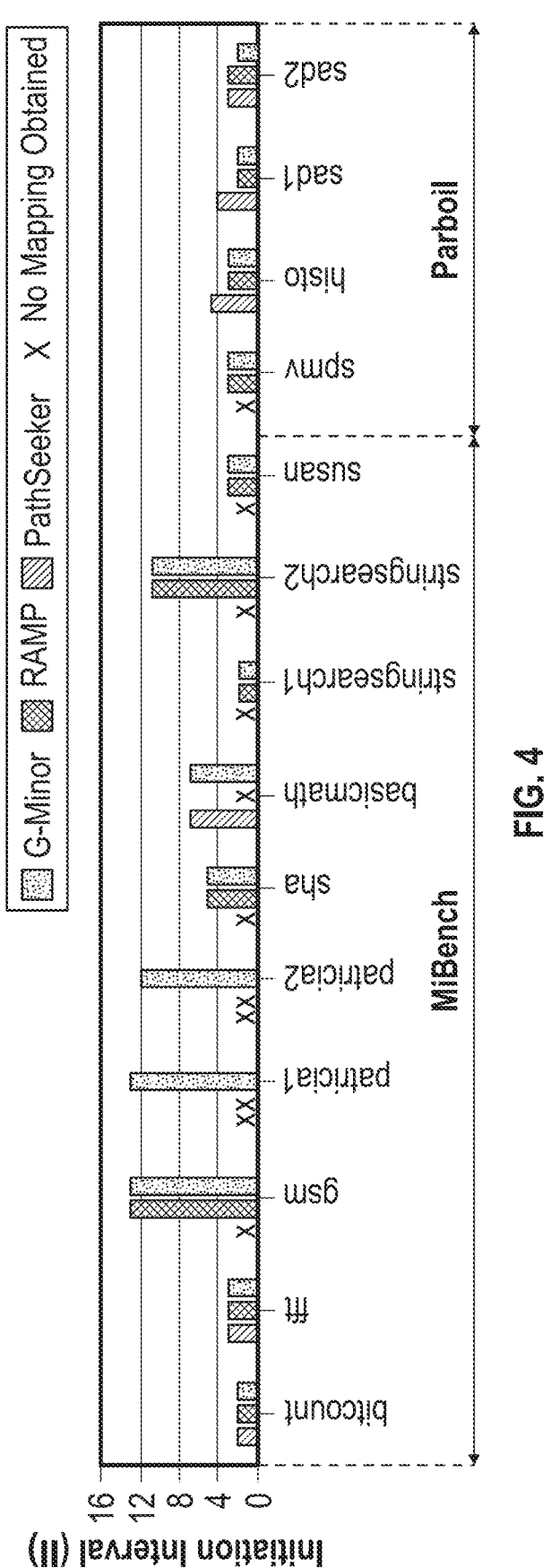
FIG. 4 is a graphical representation showing performance (II) comparison of PathSeeker with GraphMinor (G-Minor) and RAMP for application loops from MiBench and Parboil on a 4×4 CGRA.

FIGS. 3 and 4 show the performance comparison of PathSeeker with GraphMinor and RAMP. The values were recorded by executing PathSeeker, RAMP and GraphMinor on an Intel-i7 running at 2.8 GHz with 16 GB memory. A 4×4 CGRA was used for this experiment. The compilation time threshold was kept at 100,000 seconds. It can be inferred from FIGS. 3 and 4 that PathSeeker, with its novel remapping scheme was able to map all the 35 loops considered, whereas GraphMinor and RAMP were not able to map 20 and 5 loops, respectively. The loops for which a valid mapping cannot be obtained within 100,000 seconds are denoted by "X" in FIGS. 3 and 4.

The II obtained from GraphMinor and RAMP are not always optimal (lower II is better). This can particularly be noted in loops such as kmeans2, nn1, histo and sad1 where GraphMinor had higher II, and particlefilter2, myocyte2, histo, and sad2 for which RAMP had higher II. Considering the loops for which the GraphMinor has obtained a valid mapping, PathSeeker showed a 28% lower II. Compared to RAMP, PathSeeker achieved a comparable performance in all the loops and had better performance in five loops mentioned above.

Figures 5, 6:
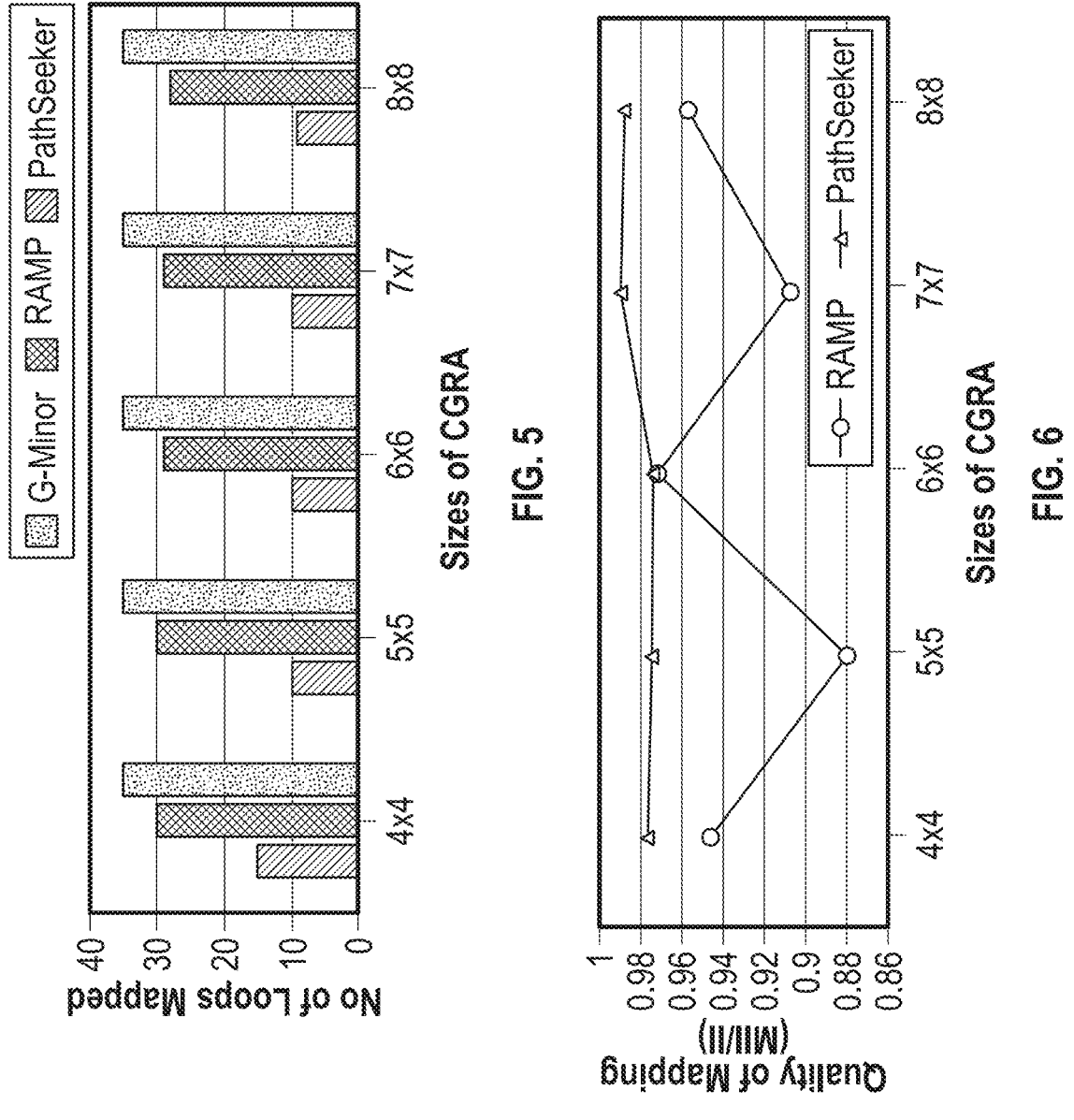
FIG. 5 is a graphical representation showing performance of the present system where PathSeeker achieved a valid mapping for the all the 35 loops across various sizes of CGRA.
FIG. 6 is a graphical representation showing performance of the present system where PathSeeker achieves a superior mapping quality (II closer to MII) compared to RAMP.

B. PathSeeker Maps All the Loops Across All the CGRA Sizes with a Better Quality The scalability experiment was applied for CGRA sizes of 5×5, 6×6, 7×7, and 8×8. FIG. 5 shows the scalability of PathSeeker with respect to GraphMinor and RAMP. One can observe that as the size of the CGRA increases the number loops mappable by GraphMinor and RAMP reduces. PathSeeker, on the other hand, is able to achieve a valid mapping for all the 35 loops considered. Due to the backtracking mechanism, GraphMinor was not able to find a mapping within the threshold of almost 75% of the loops. FIG. 5 clearly shows that arbitrary backtracking to the previously mapped nodes on encountering a mapping failure is not a scalable solution.

The Minimum II (MII) is the minimum possible II that can be achieved for a given loop DFG and the CGRA architecture. The quality of mapping of a mapping method is the ratio of MII/II which indicates how close the obtained II is to the MII. FIG. 6 shows the quality of mapping of RAMP and PathSeeker across all the five CGRA sizes. GraphMinor was not considered due to its inability to find a mapping for more than 70% of the loops. The mapping quality achieved by PathSeeker is better and consistent across all the CGRA sizes, compared to RAMP.

C. PathSeeker is a Fast Mapping Method

Figure 7:
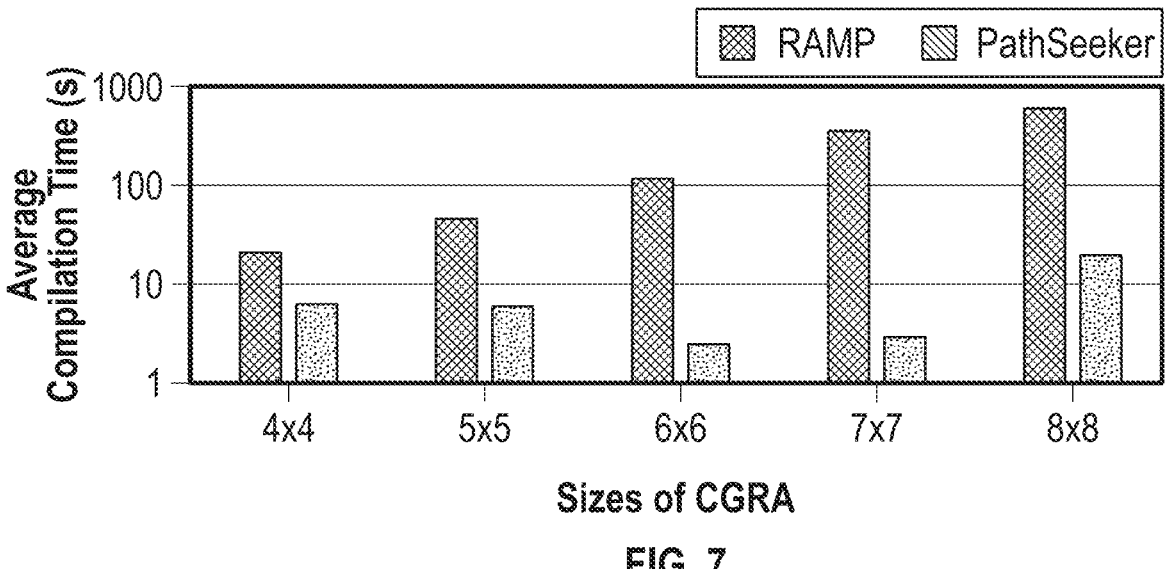
FIG. 7 is a graphical representation showing performance of the present system where PathSeeker achieves a mapping for all the loops across various sizes of CGRA at a lower compilation time.

FIG. 7 shows the scaling of average compilation times of RAMP and PathSeeker, considering only the loops that were mappable by RAMP. The y-axis of FIG. 7 shows the average compilation time across all the benchmark loops for which RAMP was able to achieve a valid mapping, in log scale, and the x-axis shows the various sizes of the CGRA. As shown in FIG. 7, the compilation time of RAMP increases exponentially, due to the restart mechanism on encountering a failure and its algorithmic complexity. In comparison, the compilation time of PathSeeker scales linearly, due to the initial randomized placement of the nodes and localized modifications of the mapping pertaining to the failed nodes.

7. Summary

This disclosure presents a novel CGRA mapping scheme, PathSeeker, that is able to map all the loops in a smaller CGRA size, with better II and lower compilation time than compared methods. Existing techniques, such as GraphMinor and RAMP, resort to backtracking to a previously mapped node or restarting the mapping process, when encountering a mapping failure. This leads to a significant increase in the compilation time and poor II. PathSeeker's novelty lies in employing localized search strategies and time-slot level remapping to rectify a mapping failure. PathSeeker was able to map all the 5 top performance-critical loops across three widely used benchmark suite loops on a 4×4 CGRA, whereas GraphMinor and RAMP were not able to map 20 and 5 loops on the same CGRA size, respectively. On comparing the loops that were mappable by GraphMinor and RAMP, PathSeeker achieved a 28% lower II compared to GraphMinor and 3% lower II compared to RAMP on a 4×4 CGRA. PathSeeker was able to get a 550× and 10× compilation time improvement compared to GraphMinor and RAMP, respectively.

Appendix A provides information about the CGRA mapping scheme disclosed herein.

8. Computer-Implemented System

Figure 8:
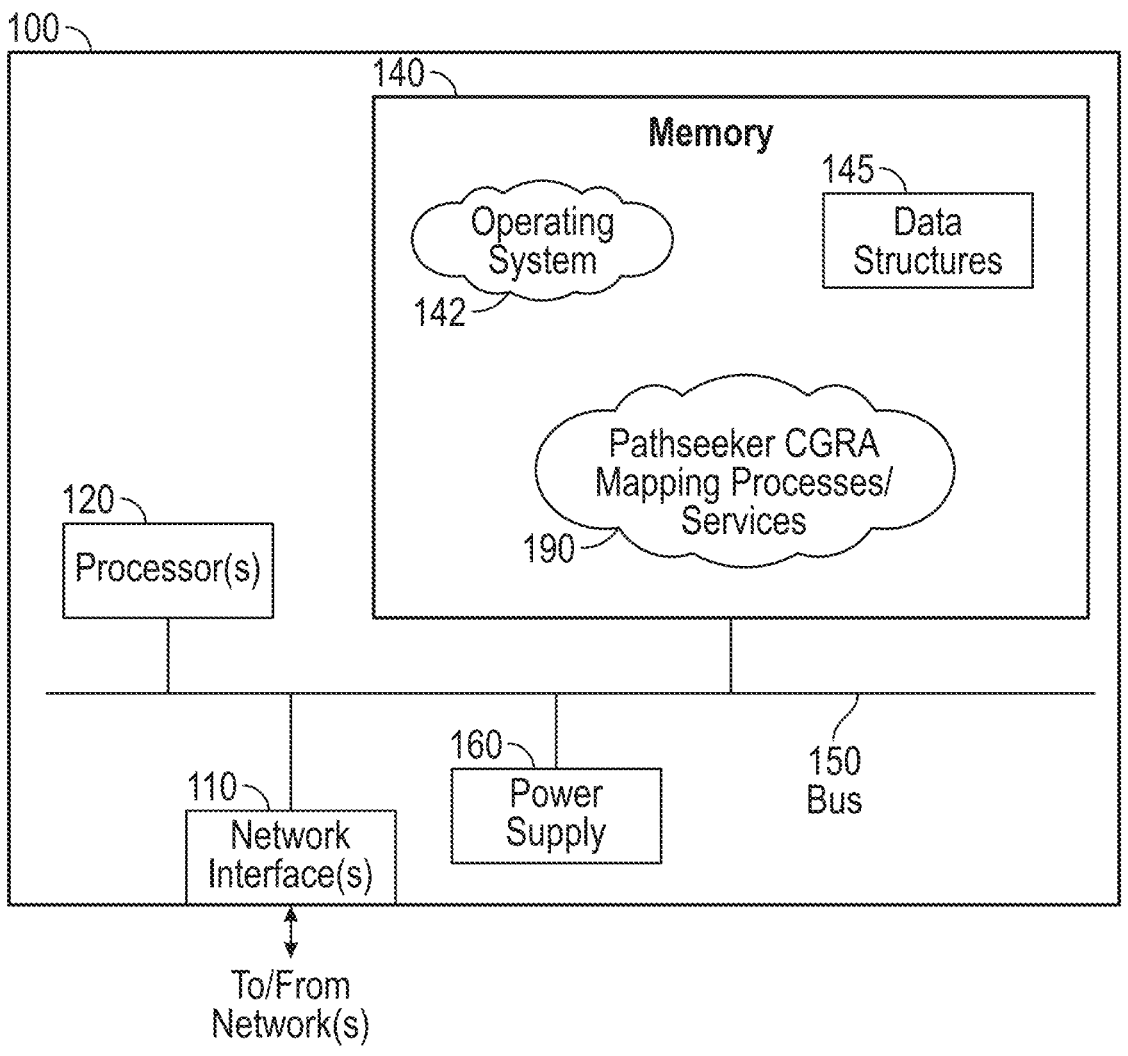
FIG. 8 is a simplified diagram showing an exemplary computing system for implementation of the system disclosed herein.

FIG. 8 is a schematic block diagram of an example device 100 that may be used with one or more embodiments described herein, e.g., as a component of the system disclosed herein and implementing aspects of Algorithms 1 and 2.

Device 100 comprises one or more network interfaces 110 (e.g., wired, wireless, PLC, etc.), at least one processor 120, and a memory 140 interconnected by a system bus 150, as well as a power supply 160 (e.g., battery, plug-in, etc.).

Network interface(s) 110 include the mechanical, electrical, and signaling circuitry for communicating data over the communication links coupled to a communication network. Network interfaces 110 are configured to transmit and/or receive data using a variety of different communication protocols. As illustrated, the box representing network interfaces 110 is shown for simplicity, and it is appreciated that such interfaces may represent different types of network connections such as wireless and wired (physical) connections. Network interfaces 110 are shown separately from power supply 160, however it is appreciated that the interfaces that support PLC protocols may communicate through power supply 160 and/or may be an integral component coupled to power supply 160.

Memory 140 includes a plurality of storage locations that are addressable by processor 120 and network interfaces 110 for storing software programs and data structures associated with the embodiments described herein. In some embodiments, device 100 may have limited memory or no memory (e.g., no memory for storage other than for programs/processes operating on the device and associated caches). Memory 140 can include instructions executable by the processor 120 that, when executed by the processor 120, cause the processor 120 to implement aspects of the system and methods outlined herein.

Processor 120 comprises hardware elements or logic adapted to execute the software programs (e.g., instructions) and manipulate data structures 145. An operating system 142, portions of which are typically resident in memory 140 and executed by the processor, functionally organizes device 100 by, inter alia, invoking operations in support of software processes and/or services executing on the device. These software processes and/or services may include PathSeeker CGRA Mapping processes/services 190, which can include aspects of Algorithms 1 and 2 and/or implementations of various modules described herein. Note that while PathSeeker CGRA Mapping processes/services 190 is illustrated in centralized memory 140, alternative embodiments provide for the process to be operated within the network interfaces 110, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the PathSeeker CGRA Mapping processes/services 190 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:

a processor in communication with a memory and a coarse-grained reconfigurable array having a plurality of nodes, the memory including instructions executable by the processor to:

retrieve, at the processor and for a failed node of the coarse-grained reconfigurable array, information about a predecessor node and a successor node of the failed node, wherein the failed node corresponds to a scheduled operation mapped to a processing element of the coarse-grained reconfigurable array;

create data structures to hold current positions and possible positions of the failed node based on the predecessor node and the successor node, wherein the current positions and possible positions identify candidate processing elements available in a timeslot of the failed node and satisfying connectivity constraints to processing elements currently assigned to the predecessor node and the successor node;

update a mapping of the predecessor node or the successor node connected to the failed node, wherein updating the mapping includes compiling a processing element to assign the predecessor node or the successor node to satisfy the connectivity constraints for mapping the failed node;

re-map one or more other nodes that share a timeslot with the failed node;

re-map one or more additional nodes that share a timeslot with the predecessor node; and re-map one or more nodes that share a timeslot with the successor node.

2. The system of claim 1, the memory further including instructions executable by the processor to:

iteratively update mappings for predecessor nodes and/or mappings for successor nodes of the failed node based on the re-mapping.

3. The system of claim 1, the memory further including instructions executable by the processor to:

iteratively update predecessor nodes and/or successor nodes of the one or more nodes that share a timeslot with the failed node based on the re-mapping.

4. The system of claim 1, the memory further including instructions executable by the processor to:

iteratively update predecessor nodes and/or successor nodes of the one or more nodes that share a timeslot with the predecessor node based on the re-mapping.

5. The system of claim 1, the memory further including instructions executable by the processor to:

iteratively update predecessor nodes and/or successor nodes of the one or more nodes that share a timeslot with the successor node based on the re-mapping.

6. A method of fast-mapping and failure-response, comprising:

initiating a mapping of scheduled operations for a plurality of nodes associated with processing element (PEs) of an accelerator, wherein the plurality of nodes are prescheduled to timeslots prior to the mapping;

identifying a mapping failure for a problem node of the plurality of nodes, wherein the mapping failure comprises determining that no available PE in a timeslot of the problem node satisfies connectivity constraints to a mapped predecessor node and a mapped successor node associated with the problem node;

analyzing a predecessor node of the plurality of nodes and a successor node of the plurality of nodes associated with the problem node;

creating data structures for each node to hold its current position and possible positions based on the predecessor node and the successor node; and invoking one or more recovery routines to resolve the mapping failure based on the predecessor node and the successor node.

7. The method of claim 6, further comprising:

performing local adjustments to the scheduled operations relative to the problem node to resolve the mapping instead of backtracking or restarting the mapping to resolve the mapping failure.

8. The method of claim 6, starting the mapping in a reverse breadth-first search graph traversal to aid the mapping of predecessors.

9. The method of claim 6, wherein the plurality of nodes are prescheduled to a timeslot before the mapping.

10. The method of claim 6, wherein the one or more recovery routines includes making changes to the predecessor node or the successor node connected to the problem node.

11. The method of claim 6, wherein the one or more recovery routines includes remapping of nodes sharing a timeslot of the problem node.

12. The method of claim 6, wherein the one or more recovery routines includes timeslot level remapping of nodes in timeslots associated with the predecessor node and the successor node.

13. The method of claim 6, wherein the initiating of the mapping of scheduled operations for the plurality of nodes includes timeslot level remapping where nodes mapped to a current node's timeslot are taken and for each of already mapped nodes local remapping is performed.

14. A non-transitory, computer-readable medium storing instructions encoded thereon, the instructions, when executed by one or more processors, cause the one or more processors to perform operations to:

access a mapping of scheduled operations for a plurality of nodes associated with processing element (PEs) of an accelerator, wherein the plurality of nodes are prescheduled to timeslots prior to the mapping;

identify a mapping failure for a problem node of the plurality of nodes, wherein the mapping failure comprises determining that no available PE in a timeslot of the problem node satisfies connectivity constraints to a mapped predecessor node and a mapped successor node associated with the problem node;

analyze a predecessor node of the plurality of nodes and a successor node of the plurality of nodes associated with the problem node;

create data structures for each node to hold its current position and possible positions based on the predecessor node and the successor node; and invoke one or more recovery routines to resolve the mapping failure based on the predecessor node and the successor node.

15. The non-transitory, computer-readable medium of claim 14, comprising further instructions encoded thereon, the further instructions, when executed by the one or more processors, cause the one or more processors to perform further operations to:

perform local adjustments to the scheduled operations relative to the problem node to resolve the mapping instead of backtracking or restarting the mapping to resolve the mapping failure.

16. The non-transitory, computer-readable medium of claim 14, comprising further instructions encoded thereon, the further instructions, when executed by the one or more processors, cause the one or more processors to perform further operations to:

start the mapping in a reverse breadth-first search graph traversal to aid the mapping of predecessors.

17. The non-transitory, computer-readable medium of claim 14, wherein the one or more recovery routines includes exploring local transformations for the predecessor node and the successor node to determine a reason for the mapping failure.

18. The non-transitory, computer-readable medium of claim 14, wherein the one or more recovery routines includes iterative exploration of different processing element positions of other nodes in the time-slot of the problem node, the predecessor node, and the successor node.

19. The non-transitory, computer-readable medium of claim 14, wherein the accelerator is a coarse-grained reconfigurable array (CGRA) including a compiler.

20. The non-transitory, computer-readable medium of claim 19, wherein the compiler is a Modulo Scheduling-based compiler.

* * * * *